US010247483B2

(12) United States Patent
Clarkson et al.

(10) Patent No.: US 10,247,483 B2
(45) Date of Patent: Apr. 2, 2019

(54) EVAPORATIVE COOLING DEVICE

(71) Applicant: Oxycom Beheer B.V., Raalte (NL)

(72) Inventors: Paul Magnus Clarkson, The Hague (NL); Andreas Jacobus Louis Nijsen, Enschede (NL); Johannes Antonius Maria Reinders, Warnsveld (NL)

(73) Assignee: Oxycom Beheer B.V., Raalte (NL)

( * ) Notice: Subject to any disclaimer, the term of this patent is extended or adjusted under 35 U.S.C. 154(b) by 0 days.

(21) Appl. No.: 15/418,868

(22) Filed: Jan. 30, 2017

(65) Prior Publication Data
US 2017/0328639 A1  Nov. 16, 2017

Related U.S. Application Data

(63) Continuation of application No. 12/158,752, filed on Sep. 23, 2008.

(51) Int. Cl.
*F28D 5/00* (2006.01)
*F28D 9/00* (2006.01)
(Continued)

(52) U.S. Cl.
CPC ............. *F28D 5/00* (2013.01); *F24F 5/0035* (2013.01); *F28D 9/0037* (2013.01); *F28D 9/0062* (2013.01); *F28F 3/025* (2013.01); *F28F 3/086* (2013.01); *F28F 13/02* (2013.01); *F24F 2001/0092* (2013.01); *F28F 2245/02* (2013.01); *Y02B 30/545* (2013.01)

(58) Field of Classification Search
CPC ... F24F 2001/0092; F24F 5/0035; F28D 5/00; F28D 9/0037; F28D 9/0062; F28F 2245/02

USPC ......................................................... 62/304
See application file for complete search history.

(56) References Cited

U.S. PATENT DOCUMENTS 2,825,210 A   3/1958  Carr
3,046,639 A   7/1962  Freyholdt
(Continued)

FOREIGN PATENT DOCUMENTS

BE    1013160 A    10/2001
CH     231124 A     2/1944
(Continued)

OTHER PUBLICATIONS

International Search Report PCT/NL2006/050332; filing date: Dec. 22, 2006.
(Continued)

*Primary Examiner* — Filip Zec
(74) *Attorney, Agent, or Firm* — N.V. Nederlandsch Octrooibureau; Catherine A. Shultz; Tamara C. Stegmann

(57) ABSTRACT

A evaporative cooling device is described having a pair of heat conducting plates arranged in spaced, generally parallel relationship with spacing elements separating the plates from one another and defining primary and secondary flow channels between the plates. Inlet ducts are connected to the primary channels and outlet ducts connect from the primary and secondary channels. A water distribution system is also provided to supply water to the secondary channels such that a primary air flow through the primary channels may be cooled by heat conduction along the plates to cause evaporation of the water into a secondary air flow through the secondary channels.

15 Claims, 8 Drawing Sheets

(51) Int. Cl.
*F28F 3/08* (2006.01)
*F24F 5/00* (2006.01)
*F28F 13/02* (2006.01)
*F28F 3/02* (2006.01)
*F24F 1/00* (2019.01)

(56) References Cited

U.S. PATENT DOCUMENTS

| | | | |
|---|---|---|---|
| 3,228,460 A | | 1/1966 | Garwin |
| 3,912,003 A | | 10/1975 | Schrade |
| 4,147,210 A | | 4/1979 | Pronko et al. |
| 4,556,521 A | * | 12/1985 | Baigas, Jr. ............... F24F 6/04 261/106 |
| 4,577,678 A | | 3/1986 | Frauenfeld et al. |
| 4,854,129 A | | 8/1989 | Hickley et al. |
| 4,879,075 A | * | 11/1989 | Hinton ................ F24F 5/0035 261/103 |
| 4,880,055 A | | 11/1989 | Niggeman |
| 4,902,449 A | * | 2/1990 | Hobbs .................. B27N 3/002 261/94 |
| 5,187,946 A | | 2/1993 | Rotenberg et al. |
| 5,312,464 A | | 5/1994 | Gay |
| 5,349,829 A | | 9/1994 | Tsimerman |
| 5,592,764 A | * | 1/1997 | Boulud .................. D06F 75/18 38/77.83 |
| 5,628,363 A | | 5/1997 | Dewar et al. |
| 5,655,600 A | | 8/1997 | Dewar et al. |
| 6,178,766 B1 | | 1/2001 | Tong et al. |
| 6,385,987 B2 | | 5/2002 | Schlom et al. |
| 6,581,402 B2 | | 6/2003 | Maisotsenko |
| 6,955,063 B2 | | 10/2005 | Adiga et al. |
| 2002/0029871 A1 | | 3/2002 | Kern |
| 2004/0226698 A1 | | 11/2004 | Reinders |
| 2007/0056309 A1 | | 3/2007 | Bhatti et al. |
| 2007/0125114 A1 | | 6/2007 | Reinders |

FOREIGN PATENT DOCUMENTS

| | | |
|---|---|---|
| GB | 2122738 | 1/1984 |
| JP | 57155087 A | 9/1982 |
| JP | 58035387 A | 3/1983 |
| JP | 2005524039 A | 8/2005 |
| WO | 199710476 A1 | 3/1997 |
| WO | 03091633 A | 11/2003 |
| WO | 2004076931 A2 | 9/2004 |
| WO | 2005019739 A1 | 3/2005 |

OTHER PUBLICATIONS

International Search Report PCT/EP2007/062157; filing date: Nov. 9, 2007.

* cited by examiner

EVAPORATIVE COOLING DEVICE

BACKGROUND OF THE INVENTION

1. Field of the Invention

The present invention relates to heat exchange devices and more particularly to evaporative cooling devices of the type that can cool a primary or product air stream evaporation of a fluid into a secondary or working air stream. Such devices can also operate to provide heat recovery in combination with ventilation.

2. Description of the Related Art

An evaporative cooler is a device that uses the latent heat of evaporation of a liquid to provide cooling. The principle of evaporative cooling has been known for many centuries. For example, a damp cloth placed over an object will keep the object cool by evaporation of liquid from the cloth. By continuously adding liquid to the cloth, the cooling effect may be maintained indefinitely without input of electrical energy. The lowest temperature that can be reached by evaporation of moisture in this way into an air stream defines the wet-bulb temperature for that air. An indirect evaporative cooler makes use of this principle. A product air stream passing over a primary surface of a heat exchange element may be cooled by a working air stream passing over and absorbing moisture from a secondary wetted surface of the heat exchanger.

According to theory, if a quantity of air is cooled by direct evaporation its absolute humidity increases due to the uptake of moisture. Its relative humidity also increases due to its lowered temperature until at the wet bulb temperature it is fully saturated with water vapour. If the air is cooled without direct evaporation however, its absolute humidity remains the same. As its temperature decreases only the relative humidity increases until full saturation of the air is reached at the so-called dew point. The dew point is thus lower than the wet bulb temperature and is in fact defined as the temperature to which a body of air must be cooled to reach saturation or 100% relative humidity. At this point, water vapour in the air condenses.

Attempts have been made to improve on the principle of indirect evaporative cooling by cooling or drying the working air stream prior to evaporation taking place. A particularly convenient way of cooling the working air stream is to feedback a portion of the cooled product air. Such devices are often referred to as dew point coolers as they may lower the temperature of the product air to below its wet bulb temperature and close to the dew point. By optimising the surfaces with which the air streams exchange heat, highly effective heat transfer can be achieved. This has been found especially significant in the case of the heat transfer from the wetted secondary surface. In order to provide moisture to the working air stream, the wetted secondary surface may be provided with some form of liquid supply e.g. in the form of a hydrophilic layer. The presence of such a layer can however result in increased thermal isolation of the secondary surface from the working air stream, thus reducing heat transfer.

A particularly efficient form of dew point cooler is known from PCT publication WO03/091633, the contents of which are hereby incorporated by reference in their entirety. The device uses a membrane having heat transfer elements on its primary and secondary surfaces. These heat transfer elements are in the form of fins and are believed to improve transmission of heat from the primary surface to the secondary surface. The fins act both to directly conduct heat to the membrane and also to break up the various boundary layers that develop in the flow. They also serve to increase the total area available for heat exchange on the relevant surfaces. Further important features of the wetted second surface are known from that document and also from PCT publication WO05/019739, the contents of which are also incorporated by reference in their entirety. Accordingly, by careful choice of the material used as a water retaining layer, optimal evaporation may be achieved without thermal isolation of the secondary surface from the working air stream.

The driving temperature differential between the primary and secondary flows of an evaporative cooler of this type must be very low in order to achieve cooling down to the dew point. As a consequence, in order for good heat transfer to occur, the heat conduction coefficient across the heat exchanger must be high. In the case of WO03/091633, the point of attachment of the fins to the membrane is believed to be an area of poor heat transmission. According to PCT publication WO 03/091648 A, attempts have been made to improve heat transmission by connecting the fins on opposing sides of a membrane directly through the membrane. According to PCT publication WO 01/57461, the fins are formed as convolutions in the membrane itself.

Metals are generally good conductors of heat and a device described in PCT publication WO04/040219 uses a heat sealable metal laminate for forming both the fins and the membrane. These are then heat sealed together. Nevertheless, the adhesive component of the laminate is believed to adversely affect the heat transfer between the fins on opposite membrane surfaces. Furthermore, during the process of connection, the area of the fins actually pressed into engagement with the membrane is generally less than desired. It should also be noted in this context that heat transfer along the membrane is undesired as it can adversely affect the temperature drop between inlet and outlet. For this reason, metal membranes have in the past generally been avoided in dew point cooling devices.

Many other configurations have also been suggested for evaporative cooling devices, all of which require heat transfer through a membrane. The membrane divides the wet region, where liquid is provided for evaporation, from the dry region. A number of constructions by Maisotsenko et al are shown in U.S. Pat. No. 6,581,402, in which primary and working streams across a plate are separated by channel guides. The secondary stream is diverted to the opposite side of the plate and receives heat by evaporation and by heat transfer from the plate.

BRIEF SUMMARY OF THE INVENTION

In order to improve heat transmission between a primary and secondary flow, there is provided according to the invention an evaporative cooling device comprising a pair of heat conducting plates arranged in spaced, generally parallel relationship and spacing elements separating the plates from one another and defining primary and secondary flow channels between the plates. In this manner, heat transmission between the primary and secondary channels can take place primarily by conduction along the plates from the region associated with the primary channels to the regions associated with the secondary channels. This is in contrast to conventional arrangements where heat transfer between fluids takes place through a membrane separating the fluids. In order to direct the first and second flows, there may be provided a primary inlet duct forming an inlet fluid connection to supply air to a set of primary flow channels and a secondary inlet duct forming an inlet fluid connection to supply air to a set of secondary channels. The inlet ducts may be formed by the plates themselves or by additional elements. There may furthermore be provided a water distribution system to provide water to the secondary channels in order to wet the walls thereof. In this manner a primary air flow through the primary channels may be cooled by heat conduction along the plates to cause evaporation of the water into a secondary air flow through the secondary channels. In the present context, reference to primary and secondary channels is, unless otherwise specified, intended to cover both the channels in their entirety and also individual channel segments within the device.

According to a further embodiment of the invention, the conducting plates may comprise boundary layer disrupting formations. Such formations or elements are important in preventing the build up of laminar flow along the channels, in particular the secondary channels. Laminar flow is generally undesirable for good heat transfer from the surface of the plate. By disrupting the boundary layers, local turbulent flow and better mixing of the saturated air may be encouraged, leading to a higher heat transfer coefficient. It is noted that turbulent flow throughout the heat exchanger is usually undesirable, as the increase in pressure drop through the channel would outweigh the benefits due to increased heat transfer. The formations may be provided on the surfaces of the plates or may be formed by local distortions or contours of the plates themselves.

Preferably the device comprises a plurality of heat conducting plates stacked in spaced, generally parallel relationship. The spacing elements define primary and secondary flow regions between or through each adjacent pair of plates. In this manner a large number of flow channels can be built up in a simple manner.

Most preferably, for such a stacked plate construction, the primary flow region between a first pair of plates is generally aligned with an adjacent primary flow region between an adjacent pair of plates. In this case openings may be provided in the plates for directing flow through the plates between adjacent primary flow channels respectively and adjacent secondary flow channels respectively. The openings may have a number of important functions. Firstly, they can act to disrupt boundary layers and break up local laminar flow, thus increasing the heat transfer coefficient. Secondly, by directing the secondary flow over both surfaces of the plate, if water or a water retaining layer is provided on one of the surfaces, the secondary flow can be alternately exposed to thermal heat transfer and latent heat. The openings are preferably in the form of louvres or similar flow directing vents. Louvres have been found to be most effective in directing saturated air away from the boundary layer and into the interior of the channels, while minimising pressure drop due to excess turbulence.

According to a first embodiment of the invention the flow channels are all generally aligned with the plates and the direction of flow in the primary channels is counter to the flow in the secondary channels. Counter flow configuration has been recognised as the most optimum for efficient dew point cooling.

According to a second embodiment of the invention the direction of flow in the primary channels is counter to the flow in the secondary channels and generally perpendicular to a main plane of the plates. Such a configuration can be achieved if the louvres or openings through the plates are sufficiently large to allow flow to take place through the plates. A significant advantage of such a configuration is that the spacing elements may act as conduction barriers, preventing heat conduction in the direction of the primary flow. This configuration may also be advantageous in providing inlet and outlet connections for the primary and secondary flows.

In an alternative embodiment, the direction of flow in the primary channels may be generally perpendicular to the flow in the secondary channels. The device will then operate in cross flow. One of the flows may be parallel to the plates and the other flow may take advantage of openings or louvres to pass through the plates. Alternatively, both flows may be partially through and partially parallel to the plates. It is noted that a considerable advantage of the present invention is the versatility that it provides in allowing different flow configurations.

According to an important feature of the invention, the device further comprises a hydrophilic layer at least partially covering the plates in the secondary flow channels. The hydrophilic layer acts as a water retaining and releasing layer. In this context, reference to water is understood to cover any other evaporative fluid that may be used in the operation of the device as an evaporative cooler. Most preferably, the hydrophilic layer is provided on one surface of the plate only. The hydrophilic layer need not be a separate layer but may also be formed as a surface treatment of the plate to improve its hydrophilicity. Cementitious materials such as Portland cement have in the past been found highly desirable. Alternatively, fibre materials may be used. It has been found to be of great importance that the water retaining layer should not obstruct heat transfer from the plate by insulating it from the secondary flow.

In a preferred embodiment, the spacing elements comprise thermally insulating material. The spacing elements may thus be considered to form a dividing membrane between the primary and secondary flow regions. They do not however function as a heat exchange membrane as in prior art constructions. The spacing elements also have a constructive function in ensuring adequate support for the plates.

In an alternative embodiment, the spacing elements may comprise portions of the plates extending generally perpendicular to a main plane of the plates. Each spacing element may support on an adjacent plate either directly or with the interpolation of an adhesive or other form of connecting element. In this case, the connecting element may partially assume the role of spacer and may also provide an insulating function between adjacent plates.

Although a function of the spacing elements has been described as providing insulation between plates, other forms of conduction barriers may be provided to reduce heat conduction in the direction of the primary flow. This of course depends on the direction chosen for the primary flow. For flow along the plates, the conduction barriers may be provided by louvres or by other small slits. In particular, narrow slits that do not allow flow to pass but nevertheless disrupt the heat conduction may be employed.

According to an important aspect of the invention, the plates should be good thermal conductors. Preferably the plates comprise aluminium, which is also light and easy to fabricate. The plates may also comprise other metals, in particular as alloys. The plate may if necessary be provided with protective layers e.g. to prevent corrosion or fouling. Nevertheless, such layers should not unduly inhibit heat transfer to the plate.

According to a preferred embodiment of the invention, outlets from the primary channels are in fluid connection with inlets to the secondary channels. In this manner part of the flow through the primary channels may be subsequently directed through the secondary channels. Operation in this manner as a dew point cooler is believed to be beneficial in achieving the highest efficiency of operation and the lowest outlet temperature from the primary channels. The fluid connection between primary outlet and secondary inlet may be on a one to one basis with one primary channel providing inlet flow to one secondary channel. Alternatively, the combined primary flow may be split and a part thereof returned and distributed to the secondary channels. In a further alternative, certain primary channels may be directed exclusively to providing secondary air to all of the secondary channels. In this context, reference to outlets from the primary channels is intended to include any suitable connection, whether internal or external that can deliver part of the primary flow to supply flow through the secondary channels.

According to a yet further aspect of the invention, there is provided an evaporative cooler comprising a heat exchanger as described above having a housing for receiving the heat exchanger, inlet ducts connecting to the primary channels, outlet ducts connecting from the primary and secondary channels, an air circulation device for causing circulation of air through the primary and secondary channels, a water supply providing water to the water distribution system and a controller for controlling operation of the cooler. Such a dew point cooler may then operate as a stand alone device or may be integrated into a larger heating and ventilation system. Additionally, temperature, pressure, humidity and other such sensors may be provided within the housing for monitoring operation and where necessary providing feedback to the controller.

BRIEF DESCRIPTION OF THE DRAWINGS

The features and advantages of the invention will be appreciated upon reference to the following drawings of a number of exemplary embodiments, in which.

DESCRIPTION OF ILLUSTRATIVE EMBODIMENTS

Figure 1A:
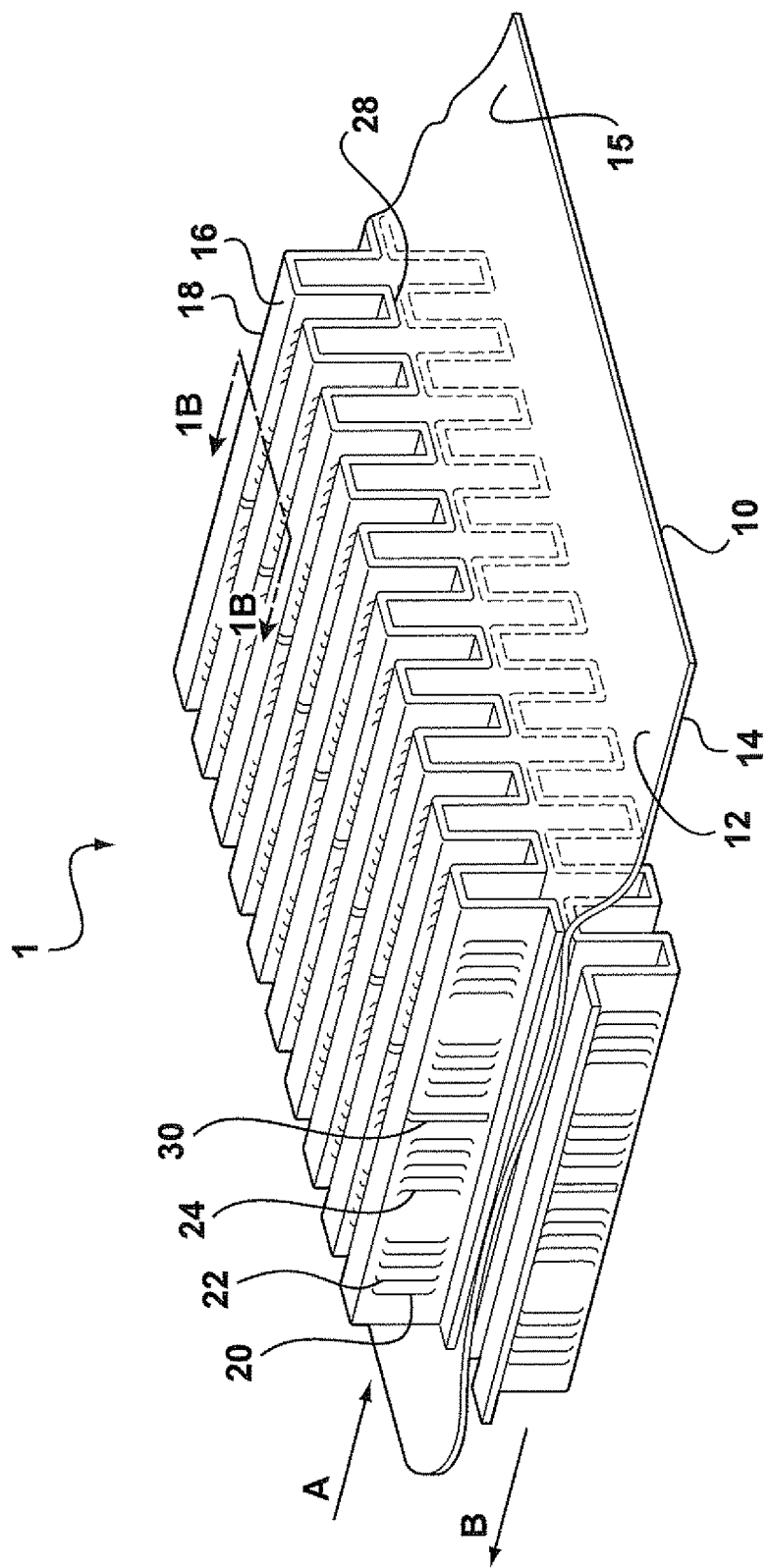
FIG. 1A shows a perspective view of part of a conventional evaporative heat exchanger.

FIG. 1A shows a section of a heat exchange element 1 of the type presently used in the prior art heat exchanger described in PCT publication WO04/040219, the content of which is hereby incorporated by reference in its entirety. The heat exchange element 1 comprises a membrane 10 having a first surface 12 and a second surface 14. Arrows A and B give an indication of the direction of air flows for use as a dew point cooler. Arrow A represents the flow of primary air over the first surface 12. Arrow 13 represents the flow of secondary air over the second surface 14. The membrane 10 is formed from a thin gauge aluminium sheet. Both sides of the membrane 10 are provided with fins 16 arranged in strips 18. The fins 16 are affixed at their bases 28 to the membrane 10 by heat seal adhesive. To this end, the fins 16 are also formed from aluminium laminated with a heat seal adhesive. In evaporative cooling devices of this type, heat exchange takes place primarily on the surfaces of the fins 16 on the second surface 14 rather than at the membrane itself. This heat is supplied by conduction within the material of the fins 16 from the fins on the first surface 12.

The fins 16 are provided with louvres 20 in the form of elongate slots penetrating through the laminate. The louvres 20 are arranged in groups. A first group 22 serves to direct flow into the surface, while a second group 24 directs flow out of the surface. By directing flow in this manner between both surfaces of the fins 16, louvres 20 serve to increase the heat transfer coefficient by breaking up the boundary layers that develop. In addition to this function, on the second surface 14 secondary air B can be caused to alternately flow over first an outer surface of the fin 16, where it can receive moisture by evaporation from a liquid retaining layer, followed by the inner surface of the fin 16 where it can receive direct thermal energy to raise its temperature. Fins 16 are also provided with conduction bridges 30. These bridges 30 are in the form of cuts through the fins 16 over substantially their whole height. They reduce unwanted transport of heat along the fins 16 in the direction of the air flow which could otherwise reduce the temperature difference between inlet and outlet.

Figure 1B:
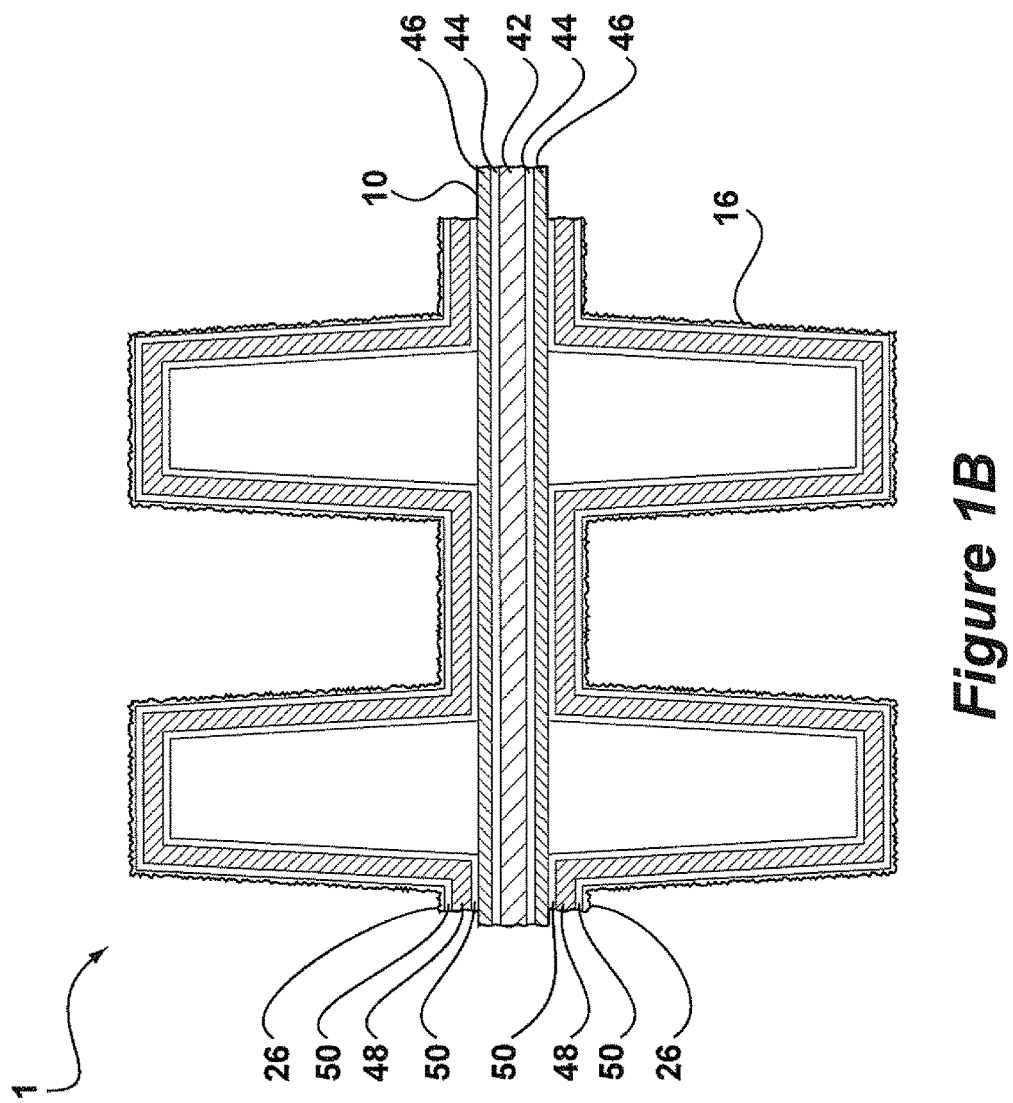
FIG. 1B shows a cross-sectional detail of part of FIG. 1A taken along line 1B-1B.

FIG. 1B shows the different layers forming the construction. The membrane 10 comprises a base layer of soft annealed aluminium 42, layers of primer 44 applied thereto and anti-corrosive adhesive layer 46 applied thereover, activated by heat and pressure for coupling of the fins 16. The fins 16 also comprise a layer of soft annealed aluminium 48 provided with layers of primer 50. The fins 16 are also provided with a liquid retaining layer 26 on their outer surface, which serves to retain and subsequently release the water for evaporation.

In order to function effectively as a dew point cooler, heat transmission between the fins 16 on the first surface 12 and the second surface 14 must be maximized by ensuring appropriate joining techniques. In order to also maximise the area of heat transfer through the membrane 10, the base or trough 28 of the fins 16 must be made as wide and as flat as possible. It has however been found, that despite great care in joining the fins 16 to the membrane 10, the area of contact is not sufficient. Furthermore, the presence of adhesives and primers in the fin/membrane/fin construction has reduced the coefficient of heat transfer across the membrane.

Figure 2:
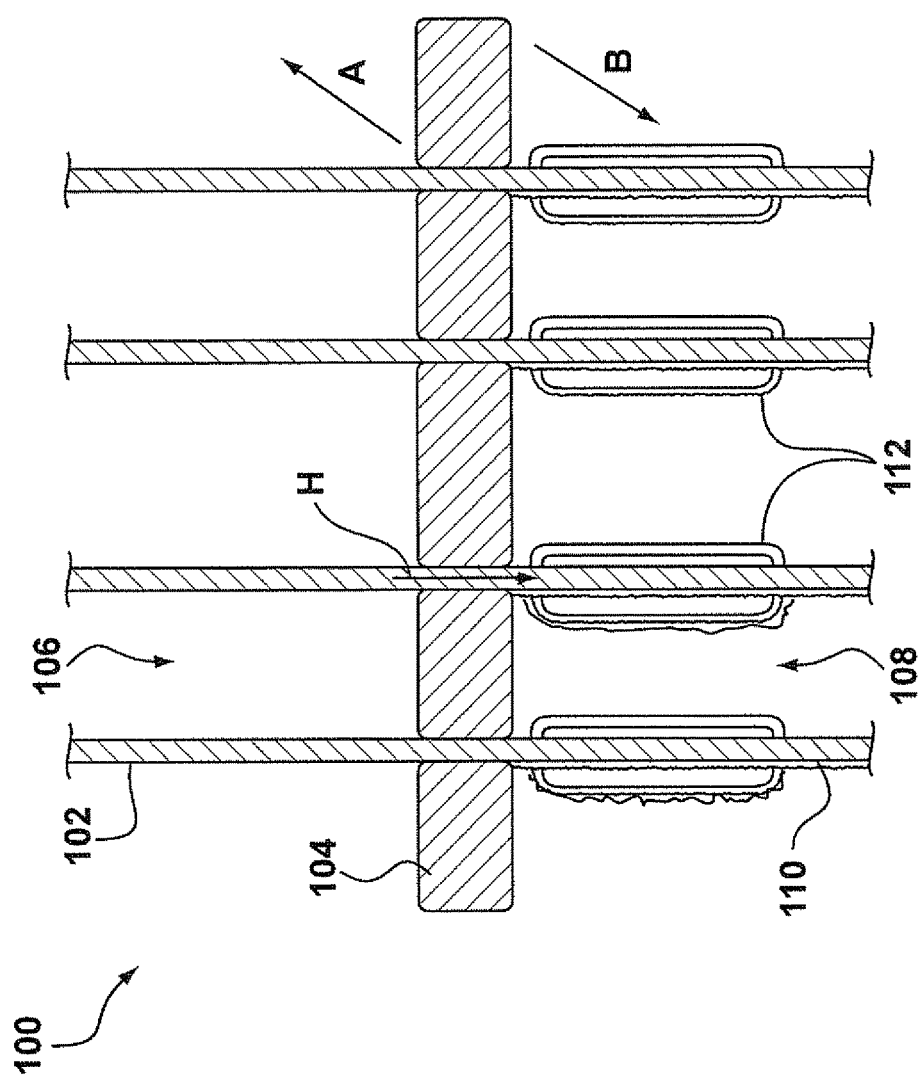
FIG. 2 shows a cross-sectional detail, similar to FIG. 1B, of a heat exchange element according to a first embodiment of the present invention.

FIG. 2 shows a cross-section through part of a heat exchange element 100 for an evaporative cooling device according to the present invention. In order to allow direct comparison with the prior art arrangement, only a section of the heat exchange element 100 is shown, corresponding to and in the same orientation as the device shown in FIG. 1B.

According to FIG. 2, there are shown a number of heat conducting plates 102 arranged in spaced, generally parallel relationship. Spacing elements 104 separate the plates 102 from one another and define, together with the plates 102, primary 106 and secondary 108 flow channels between the plates 102. The plates 102 are formed of aluminium or another suitable heat conducting material. Unlike the fins 16 of FIG. 1, the plates 102 are not provided with an adhesive layer or primer layer. The plates 102 are provided in the region of of the secondary channels 108 with a water retaining layer 110 on one of their surfaces. Louvres 112 are provided through the plates 102 in the region of the secondary channels 108. The spacing elements 104 are formed of a form-stable resin material. There is no requirement for them to be heat conductive, as their function is only to maintain the plates 102 in spaced relation and prevent air flow from the primary channels 106 to the secondary channels 108. It is in fact believed to be desirable that the spacers 104 are heat-insulating in order to reduce heat conduction in the flow direction.

Operation of the device according to FIG. 2 will now be explained in further detail. Water or another evaporable liquid is supplied to the water retaining layer 110 by means not shown. A flow of secondary air B is caused to flow through secondary channel 108. As the secondary air passes over the water retaining layer, it takes up water by evaporation. The louvres direct the air through the plate 102 where it is then warmed by direct heat transfer from the surface of the plate 102. A flow of primary air A is caused to flow through the primary channels 106 in counter flow to the secondary flow. The primary flow is cooled by direct heat transfer to the plate 102. The heat transferred to the plate 102 in the region of the primary channel is conducted within the plate 102 according to arrow H to the region of the secondary channel 108. It can thus be seen that plates 102 function as heat conducting elements rather than as heat exchange membranes.

Figure 3:
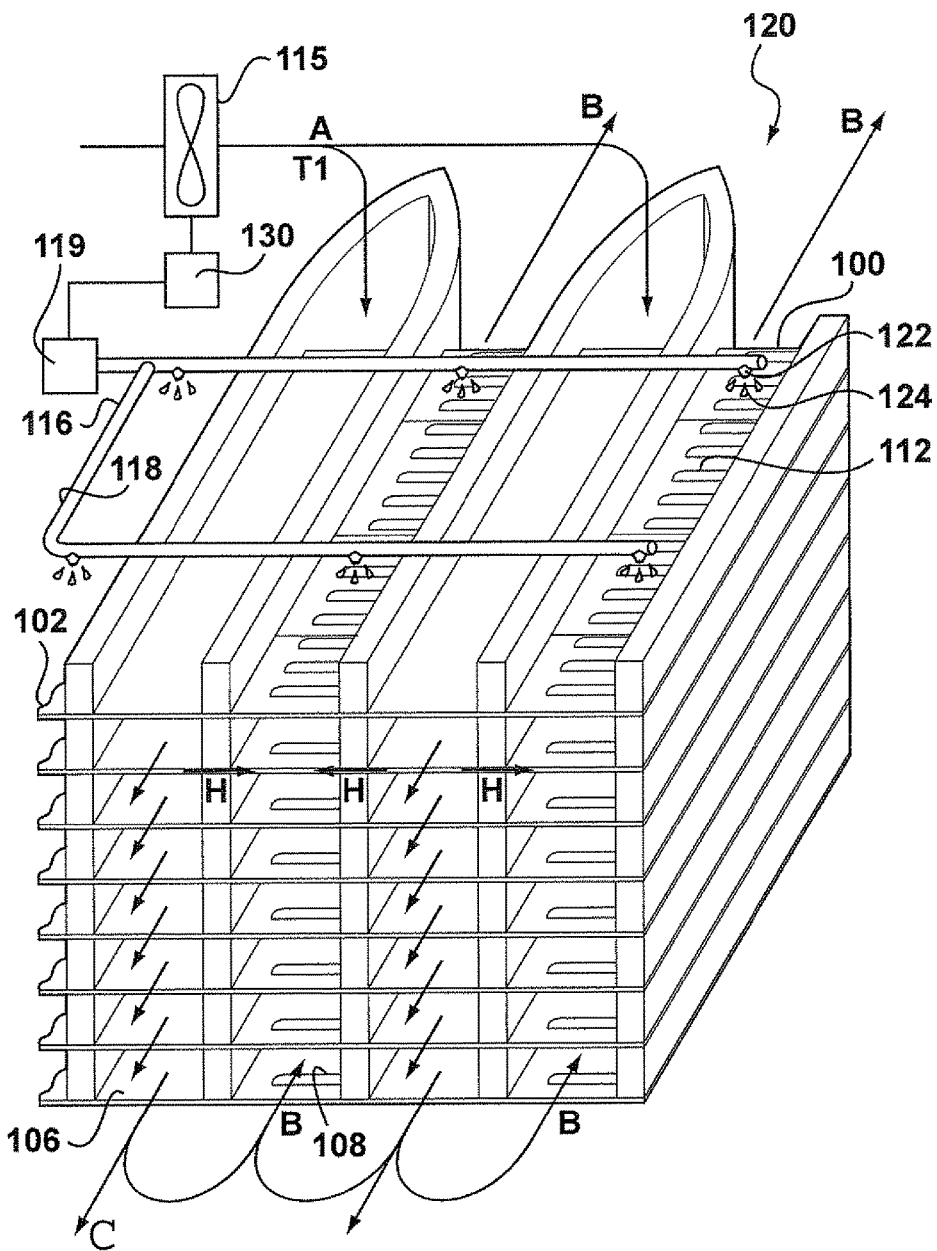
FIG. 3 shows a perspective view of the heat exchange element of FIG. 2 constructed as a dew point cooling device.

FIG. 3 shows a perspective view of the heat exchange element 100 of FIG. 2 in which the extent of the plates 102 can be seen. FIG. 3 also illustrates how the heat exchange element 100 could be built up into a dew point cooler 120. It should also be noted that the heat exchange element 100 has been rotated by 90° with respect to FIG. 2, into its operational position.

As can be seen in FIG. 3, the plates 102 extend beyond those primary 106 and secondary 108 channels shown in FIG. 2 to further primary 106 and secondary 108 channels. The extent of the plates 102 in the flow direction is also indicated. Unlike the fins 16 of the prior art device of FIG. 1 which were arranged in strips 18, the plates 102 of the present invention extend from one extremity of the heat exchange element 100 to the other. In FIG. 3, for the sake of simplicity only thirty two short channels are shown, it being understood that in reality, the plates 102 may extend considerably further in all directions whereby both the length and number of the channels 106, 108 can be greater.

FIG. 3 also illustrates inlet ducts 114 for the primary channels 106. The inlet ducts 114 are formed by the material of the spacing elements 104 extending beyond the plates 102. This material may then be formed by suitable moulding techniques into a closed inlet duct 114. The inlet ducts 114 serve to direct inlet air flow A from a circulation device 115 to the primary channels 106 and to keep it separate from the air flow B exiting the secondary channels 108. In use, the flow B will usually be saturated with moisture and will be exhausted. It is understood that other methods of forming ducts as inlets or outlets for either the primary 106 or the secondary 108 channels may also be employed as required.

A water distribution system 116 is also illustrated in FIG. 3. The water distribution system 116 is in the form of a series of conduits 118 leading from a water supply 119 to outlets 122 for ejecting droplets 124 of water into the secondary channels 108. The louvres 112 allow the droplets 124 to pass through the plates 102 to the further secondary channels located below. Alternative water distribution systems 116 may also be used. A preferred arrangement is the system presently used in the Oxycell Rooftop 400 evaporative cooler substantially as described in International Patent Publication No. WO04/076931, the content of which is hereby incorporated by reference in its entirety. Both the water supply 119 and the circulation device 115 are controlled by a controller 130. The device may be enclosed in an appropriate housing (not shown).

An important factor for the efficient operation of an evaporative cooler is the nature of the liquid retaining layer. Although reference is made to a liquid retaining layer, it is clearly understood that the layer is in fact a liquid retaining and releasing layer. A requirement of such a layer is that it easily gives up its water such that no resistance to evaporation is encountered. It is also important that it should distribute water quickly and effectively to all relevant surfaces. It should thus be hydrophilic without being hygroscopic, preferably retaining water primarily by surface tension effects.

In the embodiment of FIGS. 2 and 3, the liquid retaining layer 110 is formed from a fibrous material. The layer 110 is schematically illustrated to have a very open structure such that the metal of the plate 102 can be clearly seen through the spaces between the fibres of the layer 110. This is believed to encourage direct heat transfer from the plate 102 without smothering it. Prior art devices using thick wicking layers have effectively insulated the heat transmitting layer preventing transfer of thermal heat. An exemplary material for forming the water retaining layer 110 is a 20 g/m$^2$ polyester/viscose 50/50 blend, available from Lantor B.V. in The Netherlands. Another exemplary material is a 30 g/m$^2$ polyamide coated polyester fibre available under the name Colback™ from Colbond N.V. in The Netherlands. Other materials having similar properties including synthetic and natural fibres such as wool may also be used. Where necessary, the liquid retaining layer 110 may be coated or otherwise treated to provide anti bacterial or other anti fouling properties.

The liquid retaining layer 110 may be adhesively attached to the plate 102. For use with aluminium and Lantor fibres as mentioned above, a 2 micron layer of two-component polyurethane adhesive has been found to provide excellent results. When present as such a thin layer, its effect on heat transfer is negligible. It should furthermore be noted that the presence of the liquid retaining layer only influences heat transfer from plate 102 into the secondary flow B and does not have any significant influence on heat conduction within the plate 102 between the primary 106 and secondary 108 channels. The above-described fibrous layers have been found ideal for the purposes of manufacturing since they can be provided as a laminate that can be formed into louvres and other shapes in a continuous process. Other liquid retaining layers such as Portland cement may also be used and have in fact been found to provide superior properties although as yet, their production is more complex since there is a tendency to crack or flake if applied prior to forming of the heat exchange element. It is nevertheless believed that other surface finishes such as aluminium oxide may themselves be adequate for providing the water retention and wicking required.

Operation of the device 120 as depicted in FIG. 3 in a dew point cooler configuration will now be described based on the principle described in relation to FIG. 2. A primary air flow A enters inlet 114 at a temperature T1 and flows through primary channels 106. The flow A is driven by a circulation device 115. The flow A is cooled by heat transfer to the plate 102 to a temperature T2 close to its dew point. On exit from the primary channel 106 the cooled primary flow A is split to form a cooled product flow C and secondary flow B. The product flow C is delivered by appropriate ducts to wherever the cooled air is required. The secondary flow 13 is returned through the secondary channels 108. As the secondary flow returns, it is heated by heat transfer from the plate 102 and takes up moisture by evaporation from the water retaining layer 110. On exit from the secondary channel 108, the flow B will have returned to close to its original temperature T1 but will be almost 100% saturated. The difference in enthalpy between the flows A and B represents the amount of cooling available for the product flow C.

In the arrangement of FIG. 3, it is noted that heat may be conducted in both directions H through the plate 102 from a primary channel 106 to the secondary channels 108 on both sides thereof. Heat can also transfer in the direction of flow, which is generally undesirable. The presence of louvres 112 in the secondary channels 108 reduces longitudinal heat transfer in this region. According to the embodiment of FIG. 3, no louvres are shown in the region of the primary channels 106. It is however understood that louvres may also be provided in this region, both for encouraging turbulence and for reducing longitudinal heat transfer.

Figure 4:
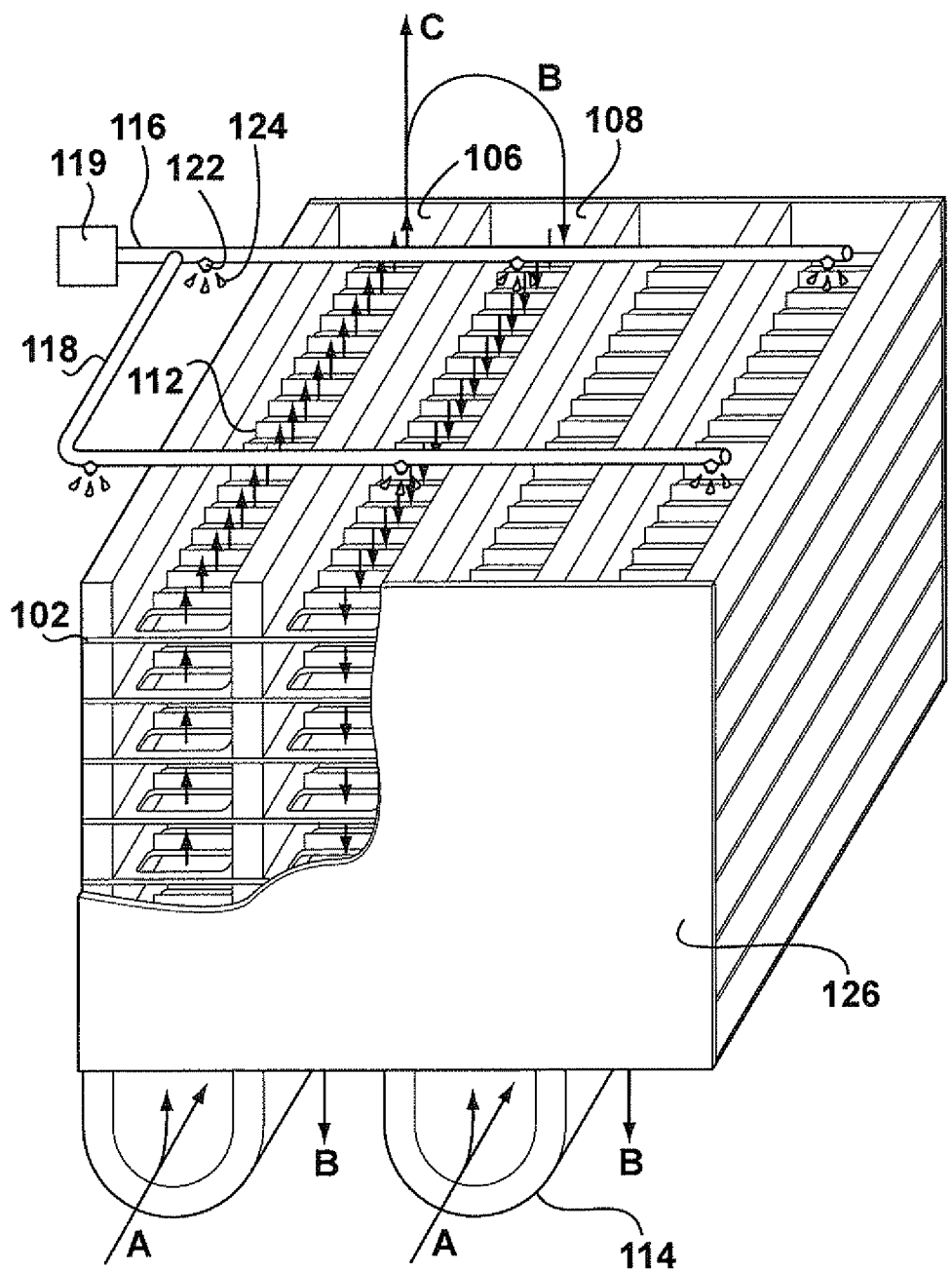
FIG. 4 shows a perspective view of a second embodiment of the invention, similar to the embodiment of FIG. 3.

FIG. 4 shows an alternative embodiment of the invention corresponding closely to the arrangement of FIG. 3. Similar elements in FIG. 4 are identified by the same reference numerals as in FIG. 3. According to FIG. 4, louvres 112 are also provided in the region of the primary channels 106. In this case, the louvres 112 are sufficiently large that the complete flows A and B may pass through without substantial resistance. Closures 126 are applied to both ends of the flow channels 106, 108. Inlet ducts 114 are formed at the lower side of the lowermost primary channels 106. In operation, flow of primary air A is directed upwards from the inlet ducts 114 and passes sequentially through each plate 102 through louvres 112. On exiting from the region of the uppermost primary channel 106 the flow is split to form a product flow C and a secondary flow B that returns downwardly through the plates 108 in the region of secondary channels 108. Operation is otherwise substantially identical to that of the embodiment of FIG. 3. A number of advantages may however be noted. Since the flows A and B are generally normal to the plates 102, there can be no heat conduction in the direction of flow. Furthermore, since the secondary flow B is aligned with the direction of water distribution, it may be used to improve transport of water. It is noted that the direction of the flows in FIG. 4 may also be reversed whereby the primary flow A is downwards. Alternatively, the arrangement may be turned on one side and water may be supplied to the secondary channels 108 through the closures 126. A further advantage of the embodiment of FIG. 4 is that the closures 126 and inlet ducts 114 (or further ducts) may be more simple to produce and connect.

The embodiments of both FIG. 3 and FIG. 4 operate in counter flow. For dew point coolers this is well recognised to be the most efficient configuration. There may however be certain circumstances where cross-flow configurations are desirable. Both the arrangement of FIG. 3 and that of FIG. 4 are suitable for operation in cross flow configuration. In FIG. 3, the secondary flow B may take place through the louvres 110 in a direction perpendicular to the plate. In FIG. 4, either flow could be redirected by provision of suitable inlet and outlet ducts.

Figure 5:
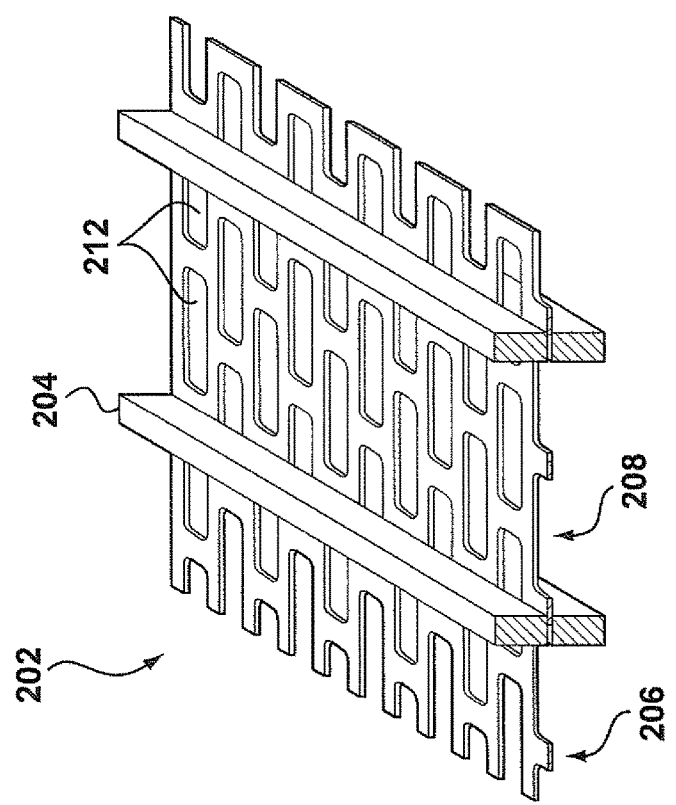
FIG. 5 shows a perspective view of an alternative heat exchange plate for use in a third embodiment of the invention.

While the embodiment of FIG. 4 has been explained with the use of louvres 112, it is understood that any suitable passages through the plates 102 may be used. It is also noted that the louvres or passages need not be confined to the individual channel regions if the material of the spacer elements is a resin that can impregnate the plate 102 and seal such passages. FIG. 5 shows a plate 202 with spacer elements 204 arranged on it to form primary channels 206 and secondary channels 208. Plate 202 is provided with openings 212 over its surface. The material of the spacer elements 204 enters into the openings 212 to prevent leakage of air from the primary channels 206 to the secondary channels 208. The spacer elements 204 on either side of the plate 202 may thus join together e.g. by melting or the like to form a substantially continuous spacer structure. As in previous examples, flow may take place generally along, or generally through the plate or even diagonally. The plates may also be provided with water retaining layers (not shown) as described above.

Figure 6:
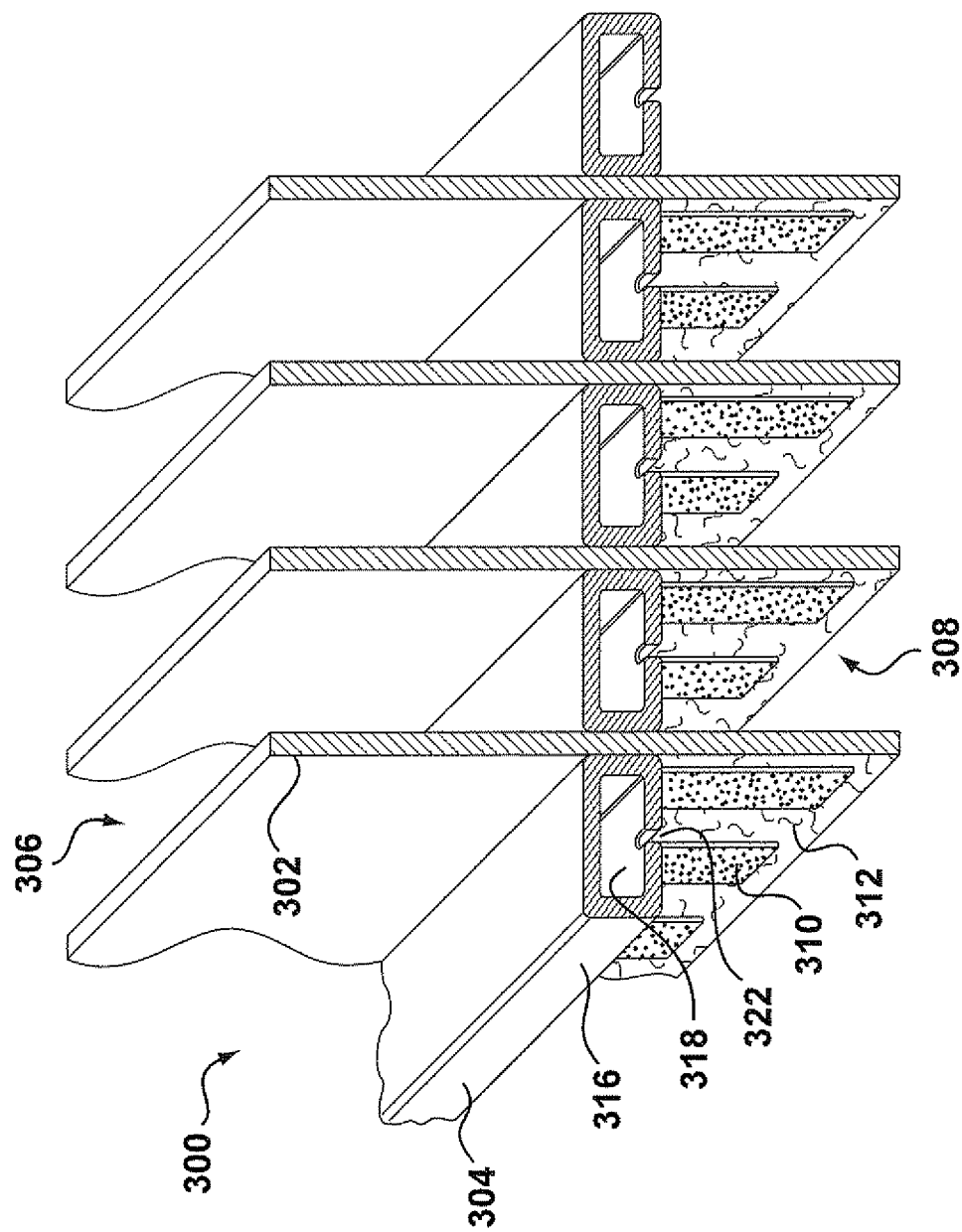
FIG. 6 shows a detail similar to FIG. 2, of a fourth embodiment of the invention.

Many further variations of the construction can be contemplated. FIG. 6 shows a cross-section through part of a heat exchange element 300 similar to that of FIG. 2. The embodiment of FIG. 6 differs from that of FIG. 2 in that no louvres are provided. Instead, the plates 302 are provided with a surface profile 312 to encourage turbulent flow. In this example, the surface profile 312 is shown as small dimples. It is understood however that the plates 302 themselves may be further profiled or corrugated to achieve the desired effect. The water retaining layer 310 is provided in the secondary channels 308 as intermittent strips such that air flow passes alternately over the metallic surface of the plate 302 and the wetted surface of the water retaining layer 310. A further feature of the embodiment of FIG. 6 is that the water distribution system 316 is provided within the spacing elements 304. Each spacing element 304 is in the form of a small resilient tube 318 having outlets 322. Supply of water to the tubes 318 under pressure causes drips to be ejected from the outlets 322 to wet the water retaining layer 310.

The embodiments of FIGS. 2 to 6 have used separate spacer elements to keep the plates apart. According to a further aspect of the invention, there is shown in cross-section in FIG. 7 an embodiment in which the spacer is formed from the material of the plate itself. According to FIG. 7, a plurality of plates 402 is formed, each having a zig-zag structure. Each plate 402 has primary channel regions 430 and secondary channel regions 432 separated by spacer regions 434. The spacer regions 434 are generally perpendicular to the primary channel regions 430 and the secondary channel regions 432. It is noted that the primary channel regions 430 are larger than the secondary channel regions 432. The reason for this difference will be explained in further detail below. The primary and secondary channel regions 430, 432 are provided with louvres 412 and the secondary channel regions 432 are provided with water retaining layers (not shown) as in the previous embodiments of FIGS. 2 to 5. The plates 402 are stacked upon one another so that the spacer regions 434 align with one another and space each plate 402 from its neighbour. The points of contact between plates are connected together by adhesive 436. The adhesive 436 also serves as a spacer in the manner of the previous embodiments. The plates may alternatively be connected together in other appropriate manners e.g. by snap mechanical connection.

Figure 7:
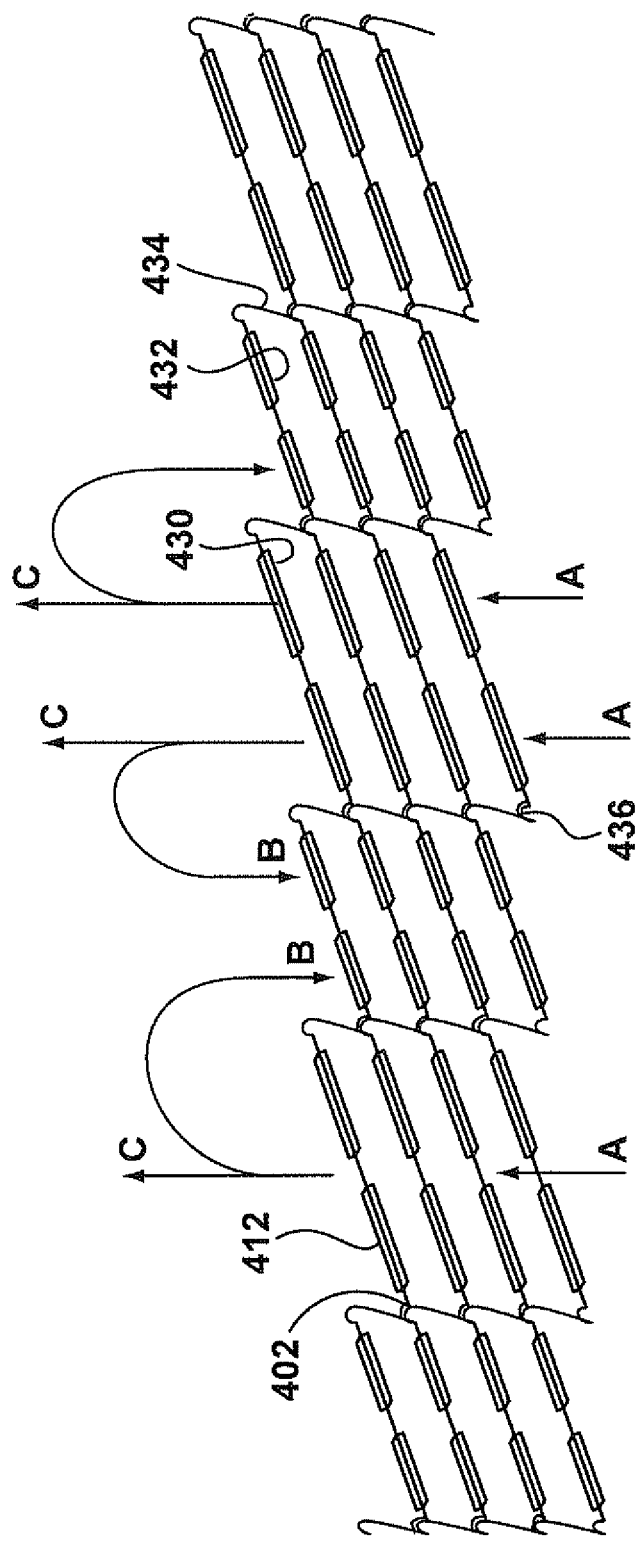
FIG. 7 shows an end view of a fifth embodiment of the invention.

Operation of the embodiment of FIG. 7 as a dew point cooler is substantially the same as that of the previous embodiments. A primary air flow A flows through primary channel regions 430. The flow A may be driven by an appropriate fan (not shown). The flow A is cooled by heat transfer to the plate 402. On exit from the primary channel regions 430 the cooled primary flow A is split to form a cooled product flow C and secondary flow B. The secondary flow B is returned through the secondary channel regions 432. As the secondary flow returns, it is heated by heat transfer from the plate 402 and takes up moisture by evaporation from the water retaining layer. Since only part of the flow returns through the secondary channel regions, their cross-sectional area need not be as great as the primary channel regions. Such differences in flow area between primary and secondary channels may also be employed in the earlier embodiments.

The flows A, B may take place through the plates 402 by passing through the louvres 410. In such a flow configuration, the adhesive 436 acts as a thermal spacer or bridge, preventing conduction in the direction of the flow. The flows A, B may also take place generally along the plates 402 whereby only a portion of the flow passes through the louvres 410.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. An evaporative cooling device comprising:
    a pair of heat conducting plates arranged in generally parallel relationship, spacing elements comprising thermally insulating resin material separating the plates from one another and defining primary and secondary flow channels between the plates, whereby the plates extend from the primary channels into the secondary channels;
    a primary air supply to the primary flow channels;
    a secondary air supply to the secondary flow channels;
    a hydrophilic layer at least partially covering the plates in the secondary flow channels; and
    a water distribution system to provide water to the secondary channels such that a primary air flow through the primary channels may be cooled by heat conduction along the plates to cause evaporation of the water into a secondary air flow through the secondary channels;
    wherein the hydrophilic layer is formed from a fibrous material.

2. The device as claimed in claim 1, further comprising boundary layer disrupting formation on the plates.

3. The device as claimed in claim 1, comprising a plurality of heat conducting plates arranged in spaced, generally parallel relationship and spacing elements defining primary and secondary flow channels between each adjacent pair of plates.

4. The device as claimed in claim 3, wherein a primary channel between a first pair of plates is generally aligned with an adjacent primary channel between an adjacent pair of plates.

5. The device as claimed in claim 4, further comprising openings for directing flow through the plates between adjacent primary flow channels respectively and adjacent secondary flow channels respectively.

6. The device as claimed in claim 5, wherein the openings are formed as louvres.

7. The device as claimed in claim 1, wherein the direction of flow in the primary channels is counter to the direction of flow in the secondary channels and generally aligned with the plates.

8. The device as claimed in claim 5, wherein the direction of flow in the primary channels is counter to the flow in the secondary channels and generally perpendicular to a main plane of the plates.

9. The device as claimed in claim 5, wherein the direction of flow in the primary channels is generally perpendicular to the flow in the secondary channels.

10. The device as claimed in claim 1, wherein the spacing elements comprise portions of the plates extending generally perpendicular to a main plane of the plates.

11. The device as claimed in claim 1, further comprising conduction barriers reducing heat conduction in the direction of the primary flow.

12. The device as claimed in claim 1, wherein the plates comprise aluminium.

13. The device as claimed in claim 1, wherein the cross-sectional areas of the primary and secondary channels are different.

14. The device as claimed in claim 1, wherein an outlet from the primary channels is in fluid connection with an inlet to the secondary channels whereby at least part of the flow through the primary channels may be subsequently directed through the secondary channels.

15. An evaporative cooler comprising a device according to claim 1, further comprising:
    a housing for receiving the device;
    inlet ducts connecting to the primary channels;
    outlet ducts connecting from the primary and secondary channels;
    an air circulation device for causing circulation of air through the primary and secondary channels;
    a water supply providing water to the water distribution system; and
    a controller for controlling operation of the cooler.

* * * * *